United States Patent Office 3,149,170
Patented Sept. 15, 1964

3,149,170
FLUORINATION OF HEXACHLOROBUTADIENE
Jared W. Clark, Charleston, and Charles E. Rectenwald, South Charleston, W. Va., assignors to Union Carbide Corporation, a corporation of New York
No Drawing. Filed Mar. 7, 1960, Ser. No. 12,954
3 Claims. (Cl. 260—653.4)

This invention relates to the preparation of perhalobutene-2 compounds. In a particular aspect, this invention relates to a process for converting hexachlorobutadiene to 2,3-dichlorohexafluorobutene-2 and 2-chloroheptafluorobutene-2.

The process of this invention comprises contacting a vapor phase mixture comprising hexachlorobutadiene hydrogen fluoride and chlorine with a chromium oxide ($Cr_2O_3$) catalyst at a temperature between 200° C. and 550° C. and recovering 2,3-dichlorohexafluorobutene-2 and 2-chloroheptafluorobutene-2 as product.

The process can be conducted either batchwise or continuously. In a preferred method, the reaction mixture is passed as vapor continuously over chromium oxide catalyst contained in a stainless steel or nickel-pipe reactor, and the effluent product gas is processed through a water scrubber and a drying unit, and then entered into a refrigerated trap where the product mixture is condensed and recovered. The components of the product mixture are conveniently separated by distillation.

The process temperature can vary between about 200° C. and 550° C., with the preferred temperature range being between about 300° C. and 400° C. The process can be performed at pressures higher or lower than atmospheric pressure. The use of pressures higher than atmospheric pressure is desirable since it increases productivity and facilitates the recovery of hydrogen chloride by-product and other low boiling materials. Pressures up to 300 p.s.i.g. and higher can be advantageously employed.

The residence time of the feed mixture in the reaction zone varies widely depending on the reaction temperature and the composition of the feed mixture. The residence time will range from as low as 0.2 second at the higher temperatures to as high as several minutes or more at the lower temperatures. In a typical reaction sequence, the residence time of the feed material in the reactor will vary between about 0.5 second and 10 seconds at reaction temperatures between 300° C. and 400° C. The conversion of hexachlorobutadiene proceeds so rapidly that a high yield of 2,3-dichlorohexafluorobutene-2 can be obtained with a residence time of the order of 0.5 second at a temperature of 400° C. to 450° C. At temperatures above about 440° C. there is some loss of catalyst life and there is increased formation of by-products such as trichlorotrifluoroethane. Temperatures below about 200° C. have the disadvantage of slow reaction rates. The rate of gas flow can be also specified in terms of space velocity. In general, space velocities between 360 and 7200 liters per liter of catalyst per hour are suitable.

The molar ratio of hydrogen fluoride and chlorine to hexachlorobutadiene can vary broadly in the range between about 4 and 10 moles of hydrogen fluoride and 1 and 2 moles of chlorine per mole of hexachlorobutadiene contained in the feed, with the preferred molar ratio being between 6 and 8 moles of hydrogen fluoride and 1.1 and 1.2 moles of chlorine per mole of hexachlorobutadiene. Additional hydrogen fluoride and chlorine must be provided if the feed material contains other components which consume hydrogen fluoride and chlorine. For example, in conducting the process 2,3-dichlorohexafluorobutene-2 can be recovered as product in the usual manner and recycled as a constituent of the feed material if it is desirable to obtain an enhanced yield of 2-chloroheptafluorobutene-2.

The use of hydrogen fluoride in a ratio of between about 6 moles and 8 moles per mole of hexachlorobutadiene suppresses the formation of partially fluorinated intermediates and by-products and permits the recovery of optimum yields of 2,3-dichlorohexafluorobutene-2.

The chromium oxide catalyst of the process can be employed in several forms. The catalyst can be in the form of granular hydrous chromium oxide which is recovered as a precipitate formed by the action of ammonium hydroxide on an aqueous solution of a chromium salt such as chromium chloride, chromium nitrate, and the like. The same hydrous chromium oxide can be employed in the form of cubes prepared from the precipitate when it is in the form of a partially dried paste. In another variation, the hydrous chromium oxide can be mixed with a minor portion of chromium chloride and pelleted. The chromium chloride in the mixture performs as a lubricant to facilitate the pelleting operation. In another variation, chromium chloride and aluminum chloride can be coprecipitated with ammonium hydroxide. The resulting precipitate can be used in the form of granules, cubes or pellets as described above. In still another variation, the chromium oxide is employed on an alumina support. The preferred alumina supported chromium oxide catalysts are those prepared in the following manner. Porous alumina is impregnated with an aqueous solution of chromium trioxide. The material is then dried and reduced at elevated temperatures in an atmosphere of hydrogen. The catalyst so produced is particularly suitable in the practice of this invention. The porous alumina employed may be either alpha-alumina or the activated type such as chi-alumina, gamma-alumina, kappa-alumina, and the like.

To recover conveniently the product mixture produced by the process, the effluent gas is scrubbed with water, dried with a drying agent such as calcium chloride, and then condensed in a Dry Ice-cooled trap. The product mixture is fractionally distilled to separate 2,3-dichlorohexafluorobutene - 2 and 2 - chloroheptafluorobutene - 2 product from other components contained in the mixture.

The process of this invention is superior to present methods known and practiced in the art for producing 2,3-dichlorohexafluorobutene-2 and 2-chloroheptafluorobutene-2. These compounds have many uses which are presently restricted by economic considerations. 2,3-dichlorohexafluorobutene-2 can be oxidized to trifluoroacetic acid. It can also be converted to perfluorobutene and perfluorobutane by the following reaction sequence:

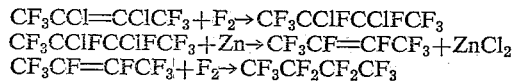
$$CF_3CCl\!=\!CClCF_3 + F_2 \rightarrow CF_3CClFCClFCF_3$$
$$CF_3CClFCClFCF_3 + Zn \rightarrow CF_3CF\!=\!CFCF_3 + ZnCl_2$$
$$CF_3CF\!=\!CFCF_3 + F_2 \rightarrow CF_3CF_2CF_2CF_3$$

2-chloroheptafluorobutene-2, as a chemical intermediate, can be chlorinated to trichloroheptafluorobutane which is a highly stable compound currently being used as a heat transfer liquid. 2-chloroheptafluorobutene-2 can also be fluorinated to chlorononafluorobutane which has utility as a refrigerant and as a foaming agent for polyurethane and other plastic foams.

The following examples will serve to illustrate specific embodiments of the invention.

EXAMPLE 1

This example illustrates the preparation of chromium catalysts useful in the practice of this invention.

(a) Water (1145 milliliters) and ammonium hydroxide (588 grams, 28 percent $NH_3$) were placed in a flask equipped with a mechanical stirrer and a dropping funnel. A chromic chloride solution (520 grams of a 37 percent chromic chloride solution and one liter of water) was added dropwise to the contents of the flask with stirring during a one-hour period. The resulting precipitate was separated from the supernatant liquid, and the precipitate was washed with water to remove ammonium chloride. The precipitate was then placed in a shallow pan and dried in a vacuum oven at 70° C. When the material was partially dried the paste was cut into small squares so that the hydrous chromium oxide $$(Cr_2O_3 \cdot XH_2O)$$

catalyst after complete drying was in the form of ¼-inch cubes. The final drying of the hydrous chromium oxide catalyst was accomplished at a temperature of 480° C. under an atmosphere of nitrogen.

(b) Approximately 600 milliliters (247 grams) of hydrous chromium oxide prepared in the manner of section (a) above was mixed with 45 grams of anhydrous chromic chloride, and the mixture was ground in a ball mill for sixteen hours. The fine powder obtained was pelleted, employing ³⁄₃₂-inch dies.

(c) Approximately 344 grams (2.5 moles) of aluminum chloride was dissolved in 1.5 liters of water. This solution was blended with a solution containing 395 grams (2.5 moles) of chromic chloride in 3.67 liters of water. The resulting solution was fed with vigorous agitation into a flask containing 920 grams of ammonium hydroxide (28 percent $NH_3$), diluted with 4 liters of water. The resulting precipitate was separated and washed several times with water. The material was transferred to shallow pans, cut into ¼-inch cubes and dried in an oven at 60° C., and then dried in a furnace at 450° C. for two days.

(d) Approximately 67.1 grams of chromium trioxide ($CrO_3$) was dissolved in 102 grams of water. This solution was then added slowely with frequent agitation to 300 milliliters of Alcoa F–10 activated alumina (gamma-form, 6–8 mesh) contained in an evacuated flask. The material was partially dried by heating the flask under reduced pressure. It was then transferred to a one-inch I.D. nickel reactor and heated to 200° C. under a constant flow of nitrogen to complete the drying of the catalyst. The orange-red catalyst was then reduced with hydrogen for four hours at 250° C. to 300° C. to produce green colored chromic oxide ($Cr_2O_3$) supported on gamma-alumina.

In a similar manner, a catalyst of chromium oxide supported on alpha-alumina was prepared. The alpha-alumina supported catalyst had the advantage of additional mechanical strength.

EXAMPLE 2

Hexachlorobutadiene (285 grams), hydrogen fluoride (100 grams) and chlorine (145 grams) were passed as vapor over 200 milliliters of alpha-alumina supported chromium oxide ($Cr_2O_3$) catalyst [prepared in a manner similar to section (d) of Example 1 above] contained in a one-inch I.D. nickel-pipe reactor. The reaction temperature was maintained at 330° C. to 350° C. over a two and one-half hour reaction period. The reactor effluent gas was passed in turn through a water scrubber, a calcium chloride drying tower and Dry Ice-cooled traps. The cold trap product condensate was vaporized through molten antimony trichloride to remove chlorine, and it was then combined with organic products recovered from the water scrubber. Distillation of the product mixture afforded approximately 152 grams (60 percent yield) of 2,3-dichlorohexafluorobutene-2, boiling point 67° C.

EXAMPLE 3

Hexachlorobutadiene, hydrogen fluoride and chlorine, in a molar ratio of 1 to 7 to 1.3, were vaporized over one liter of activated alumina supported chromium oxide ($Cr_2O_3$) catalyst (prepared as in the previous example) at temperatures in the range between 300° C. and 400° C. The results of three runs are summarized below.

*Chlorination and Fluorination of Hexachlorobutadiene*

| | | | | | | |
|---|---|---|---|---|---|---|
| Temperature, ° C. | 300–400 | | 300–400 | | 300–400 | |
| Catalyst volume, ml. | 1,000 | | 1,000 | | 1,000 | |
| | G. | Moles | G. | Moles | G. | Moles |
| Feed: | | | | | | |
| Hexachlorobutadiene | 3,040 | 11.66 | 5,330 | 20.4 | 6,598 | 25.3 |
| Hydrogen fluoride | 1,637 | 81.85 | 2,848 | 142.4 | 3,702 | 185.1 |
| Chlorine | 1,005 | 14.16 | 1,895 | 26.7 | 2,400 | 33.8 |
| Molar ratio $C_4Cl_6$/HF/$Cl_2$ | 1.0/7.0/1.2 | | 1.0/6.8/1.3 | | 1.0/7.3/1.3 | |
| Residence time, seconds | 3.6 | | 2.4 | | 1.73 | |
| Duration of run, hours | 5.5 | | 6.5 | | 6.0 | |
| | G. | Moles | G. | Moles | G. | Moles |
| Products: | | | | | | |
| Low boiling fraction ¹ | 121 | | 123 | | 223 | |
| 2,3-Dichlorohexafluorobutene-2 | 1,941 | 8.34 | 3,911 | 16.8 | 4,685 | 20.1 |
| Yield to $C_4Cl_2F_6$, percent | 71.6 | | 82.2 | | 79.5 | |
| Production ratio, g./l./hr. | 353 | | 601 | | 780 | |

¹ Includes 2-chloroheptafluorobutene-2.

EXAMPLE 4

Hexachlorobutadiene (5150 grams), hydrogen fluoride (2826 grams) and chlorine (1855 grams) were passed as vapor over 300 milliliters of pelleted hydrous chromium oxide ($Cr_2O_3 \cdot XH_2O$) catalyst [prepared in a manner similar to section (b) of Example 1 above] contained in a one-inch I.D. nickel-pipe reactor. The reaction temperature was maintained at 425° C. to 470° C. over a five-hour reaction period. Distillation of the product mixture contained in the cold trap afforded 3128 grams of 2,3-dichlorohexafluorobutene-2 (68 percent yield, boiling point 67.8° C.) along with 288 grams of lower boiling products and 1009 grams of higher boiling materials.

EXAMPLE 5

Hexachlorobutadiene (910 grams), hydrogen fluoride (473 grams) and chlorine (360 grams) were passed as vapor over 300 milliliters of pelleted hydrous chromium oxide ($Cr_2O_3 \cdot XH_2O$) catalyst at a temperature between 230° C. to 300° C. for a reaction period of five and one-half hours. Distillation of the product mixture afforded 391 grams of 2,3-dichlorohexafluorobutene-2 (48 percent yield) along with 24 grams of lower boiling products and 340 grams of higher boiling materials.

EXAMPLE 6

This example illustrates the fluorination of 2,3-dichlorohexafluorobutene-2.

2,3-dichlorohexafluorobutene-2 (585 grams) and hydrogen fluoride (242 grams) were vaporized over 300 milliliters of pelleted hydrous chromium oxide catalyst at a temperature of 450° C. to 460° C. for a reaction period of 2.7 hours. Distillation of the recovered product mixture afforded 208 grams of 2-chloroheptafluorobutene-2 (38 percent yield) along with 20 grams of lower boiling product and 267 grams of recovered feed material.

EXAMPLE 7

This example illustrates the fluorination of 2,3-dichlorohexafluorobutene-2.

Over a five hour reaction period, 2,3-dichlorohexafluorobutene-2 (3330 grams) and hydrogen fluoride (533 grams) were passed as vapor over 300 milliliters of pelleted hydrous chromium oxide ($Cr_2O_3 \cdot XH_2O$) catalyst at a temperature of 495° C. to 500° C. The effluent gas from the one-inch I.D. nickel-pipe reactor was condensed in the usual manner. Distillation of the product mixture afforded 1134 grams of 2-chloroheptafluorobutene-2 (37 percent yield) along with 128 grams of lower boiling product and 1919 grams of unreacted 2,3-dichlorohexafluorobutene-2.

What is claimed is:

1. A process which comprises heating a mixture comprising hexachlorobutadiene, hydrogen fluoride and a chlorine at a temperature between 200° C. and 550° C. in the presence of a chromium oxide catalyst and recovering perfluorochlorobutene-2 as product.

2. A process which comprises passing a mixture comprising hexachlorobutadiene, hydrogen fluoride and chlorine as vapor over chromium oxide catalyst at a temperature between 200° C. and 550° C. and recovering 2,3-dichlorohexafluorobutene-2 and 2-chloroheptafluorobutene-2 as product.

3. A method for producing 2-chloroheptafluorobutene-2 which comprises contacting a feed mixture comprising hexachlorobutadiene, hydrogen fluoride and chlorine with a chromium oxide catalyst at a temperature between 200° C. and 550° C., separating 2-chloroheptafluorobutene-2 and 2,3-dichlorohexafluorobutene-2 from the effluent product mixture and recycling said 2,3-dichlorohexafluorobutene-2 to said feed mixture.

References Cited in the file of this patent

UNITED STATES PATENTS

| | | |
|---|---|---|
| 2,436,357 | Gochenour et al. | Feb. 17, 1948 |
| 2,892,000 | Skiles et al. | June 23, 1959 |